United States Patent
Kolouri et al.

(10) Patent No.: US 10,755,424 B2
(45) Date of Patent: Aug. 25, 2020

(54) PREDICTION OF MULTI-AGENT ADVERSARIAL MOVEMENTS THROUGH SIGNATURE-FORMATIONS USING RADON-CUMULATIVE DISTRIBUTION TRANSFORM AND CANONICAL CORRELATION ANALYSIS

(71) Applicant: HRL Laboratories, LLC, Malibu, CA (US)

(72) Inventors: Soheil Kolouri, Calabasas, CA (US); Amir M. Rahimi, Malibu, CA (US); Rajan Bhattacharyya, Sherman Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 278 days.

(21) Appl. No.: 15/971,982

(22) Filed: May 4, 2018

(65) Prior Publication Data
US 2018/0322642 A1 Nov. 8, 2018

Related U.S. Application Data

(60) Provisional application No. 62/502,441, filed on May 5, 2017.

(51) Int. Cl.
*G06K 9/62* (2006.01)
*G06T 7/262* (2017.01)
(Continued)

(52) U.S. Cl.
CPC ............... *G06T 7/262* (2017.01); *G06K 9/00* (2013.01); *G06K 9/0063* (2013.01);
(Continued)

(58) Field of Classification Search
CPC .. G06K 9/00; G06K 9/00335; G06K 9/00342; G06K 9/00348; G06K 9/00624;
(Continued)

(56) References Cited

U.S. PATENT DOCUMENTS 8,780,204 B2 * 7/2014 DeAngelis ......... G06K 9/00724
348/157
9,177,259 B1 * 11/2015 Levchuk ............... G06N 20/00
(Continued)

FOREIGN PATENT DOCUMENTS

WO WO2016-191652 A1 12/2016

OTHER PUBLICATIONS

Maryann Asadi-Aghbolaghi, Shohreh Kasaei, "View Invariant Human Action Recognition Using Fourier-based and Radon-based Point Cloud Analysis", IEEE, 7th International Symposium on Telecommunications, 2014, pp. 66-71 (Year: 2014).*
(Continued)

*Primary Examiner* — Eric Rush
(74) *Attorney, Agent, or Firm* — Tope-McKay & Associates

(57) ABSTRACT

Described is a system for predicting multi-agent movements. A Radon Cumulative Distribution Transform (Radon-CDT) is applied to pairs of signature-formations representing agent movements. Canonical correlation analysis (CCA) components are identified for the pairs of signature-formations. Then, a relationship between the pairs of signature formations is learned using the CCA components. A counter signature-formation for a new dataset is predicted using the learned relationship and a new signature-formation. Control parameters of a device can be adjusted based on the predicted counter signature-formation.

18 Claims, 9 Drawing Sheets
(4 of 9 Drawing Sheet(s) Filed in Color)

(51) Int. Cl.

| | |
|---|---|
| *G06T 7/277* | (2017.01) |
| *G06N 3/00* | (2006.01) |
| *G06N 20/00* | (2019.01) |
| *G06K 9/00* | (2006.01) |
| *A63B 69/00* | (2006.01) |
| *G08G 5/00* | (2006.01) |
| *G08G 9/00* | (2006.01) |
| *A63B 24/00* | (2006.01) |

(52) U.S. Cl.
CPC ..... *G06K 9/00335* (2013.01); *G06K 9/00718* (2013.01); *G06K 9/00744* (2013.01); *G06K 9/6211* (2013.01); *G06K 9/6214* (2013.01); *G06K 9/6232* (2013.01); *G06K 9/6245* (2013.01); *G06K 9/6247* (2013.01); *G06N 3/006* (2013.01); *G06N 20/00* (2019.01); *G06T 7/277* (2017.01); *A63B 69/0071* (2013.01); *A63B 2024/0056* (2013.01); *G06T 2207/20081* (2013.01); *G06T 2207/30196* (2013.01); *G06T 2207/30221* (2013.01); *G06T 2207/30241* (2013.01); *G08G 5/0069* (2013.01); *G08G 9/00* (2013.01)

(58) Field of Classification Search
CPC .............. G06K 9/0063; G06K 9/00711; G06K 9/00718; G06K 9/00724; G06K 9/00744; G06K 9/00758; G06K 9/00765; G06K 9/00771; G06K 9/00785; G06K 9/00791; G06K 9/62; G06K 9/6206; G06K 9/6209; G06K 9/6211; G06K 9/6214; G06K 9/6217; G06K 9/6218; G06K 9/6232; G06K 9/6244; G06K 9/6245; G06K 9/6247; G06K 9/6248; G06K 9/6251; G06K 9/6255; G06K 9/6256; G06T 7/20; G06T 7/262; G06T 7/277; G06T 2207/20048; G06T 2207/20076; G06T 2207/20081; G06T 2207/30196; G06T 2207/30221; G06T 2207/30228; G06T 2207/30241; A63B 24/0003; A63B 24/0021; A63B 2024/0025; A63B 2024/0056; A63B 69/002; A63B 69/0024; A63B 69/0026; A63B 69/0071; G06N 3/006; G06N 20/00; G08G 5/0069; G08G 9/00
USPC ....... 382/100, 103, 104, 107, 155, 159, 160, 382/181, 190, 224, 225, 229, 230, 276, 382/278, 291; 348/135, 142, 143, 148, 348/149, 157, 161, 169; 706/16–18, 20, 706/21, 23, 24, 45–48, 902, 903, 905
See application file for complete search history.

(56) References Cited

U.S. PATENT DOCUMENTS

| | | | |
|---|---|---|---|
| 9,607,015 B2 * | 3/2017 | Gao | G06K 9/00711 |
| 9,630,318 B2 * | 4/2017 | Ibarz Gabardos | G06N 3/00 |
| 10,201,752 B2 * | 2/2019 | Lucey | G06N 20/00 |
| 10,583,324 B2 * | 3/2020 | Rahimi | G06K 9/6223 |
| 2011/0013836 A1 | 1/2011 | Gefen et al. | |
| 2011/0302118 A1 | 12/2011 | Melvin et al. | |
| 2012/0106800 A1 | 5/2012 | Khan et al. | |
| 2014/0236331 A1 * | 8/2014 | Lehmann | G09B 19/0038 700/93 |
| 2016/0008693 A1 * | 1/2016 | Cronin | G06K 9/00724 700/91 |
| 2016/0092769 A1 | 3/2016 | Lucey et al. | |
| 2019/0251366 A1 * | 8/2019 | Zhong | G06K 9/00724 |

OTHER PUBLICATIONS

Long Sha, Patrick Lucey, Yisong Yue, Peter Carr, Charlie Rohlf, Iain Matthews, "Chalkboarding: A New Spatiotemporal Query Paradigm for Sports Play Retrieval", Proceedings of the 21st International Conference on Intelligent User Interfaces, Mar. 2016, pp. 336-347 (Year: 2016).*
Lucey, Patrick, et al. "Representing and discovering adversarial team behaviors using player roles." Proceedings of the IEEE Conference on Computer Vision and Pattern Recognition, 2013, pp. 2706-2713.
Ali, Saad, and Mubarak Shah. "Floor fields for tracking in high density crowd scenes." European conference on computer vision. Springer Berlin Heidelberg, 2008, pp. 1-14.
Pellegrini, Stefano, et al. "You'll never walk alone: Modeling social behavior for multi-target tracking." 2009 IEEE 12th International Conference on Computer Vision, pp. 261-268.
Bialkowski, Alina, et al. "Recognising team activities from noisy data." Proceedings of the IEEE Conference on Computer Vision and Pattern Recognition Workshops, 2013, pp. 984-990.
Wang, Heng, et al. "Action recognition by dense trajectories." Computer Vision and Pattern Recognition (CVPR), 2011 IEEE, Conference on, pp. 3169-3176.
Tran, Du, and Junsong Yuan. "Optimal spatio-temporal path discovery for video event detection." Computer Vision and Pattern Recognition (CVPR), 2011 IEEE Conference on, pp. 3321-3328.
Intille, Stephen S., and Aaron F. Bobick. "A framework for recognizing multi-agent action from visual evidence." AAAI/IAAI 99, pp. 518-525, 1999.
Li, Ruonan, Rama Chellappa, and Shaohua Kevin Zhou. "Learning multi-modal densities on discriminative temporal interaction manifold for group activity recognition." Computer Vision and Pattern Recognition, CVPR 2009, IEEE Conference on, pp. 2450-2457.
Li, Ruonan, and Rama Chellappa. "Group motion segmentation using a spatio-temporal driving force model." Computer Vision and Pattern Recognition (CVPR), 2010 IEEE Conference on, pp. 2038-2045.
Wang, Xinchao, et al. "Tracking interacting objects optimally using integer programming." European Conference on Computer Vision. Springer International Publishing, ECCV 2014, Part I, LNCS 8689, pp. 17-32.
Bialkowski, Alina, et al. "Win at home and draw away: automatic formation analysis highlighting the differences in home and away team behaviors." Proceedings of 8th Annual MIT Sloan Sports Analytics Conference, 2014, pp. 1-7.
Kim, Kihwan, et al. "Motion fields to predict play evolution in dynamic sport scenes." Computer Vision and Pattern Recognition (CVPR), 2010 IEEE Conference on, pp. 840-847.
Kolouri, Soheil, Saurav Basu, and Gustavo K. Rohde. "Learning and visualizing statistical relationships between protein distributions from microscopy images." In 2014 IEEE 11th International Symposium on Biomedical Imaging (ISBI), pp. 381-384.
Kolouri, Soheil, Se Rim Park, and Gustavo K. Rohde. "The Radon cumulative distribution transform and its application to image classification." IEEE Transactions on Image Processing 25, No. 2, pp. 920-934, 2016.
International Preliminary Report on Patentability for PCT/US2018/031240; dated May 31, 2019.
Notification of Transmittal of International Search Report and the Written Opinion of the International Searching Authority for PCT/US2018/031240; dated Aug. 23, 2018.
International Search Report of the International Searching Authority for PCT/US2018/031240; dated Aug. 23, 2018.
Written Opinion of the International Searching Authority for PCT/US2018/031240; dated Aug. 23, 2018.

* cited by examiner

US 10,755,424 B2

PREDICTION OF MULTI-AGENT ADVERSARIAL MOVEMENTS THROUGH SIGNATURE-FORMATIONS USING RADON-CUMULATIVE DISTRIBUTION TRANSFORM AND CANONICAL CORRELATION ANALYSIS

CROSS-REFERENCE TO RELATED APPLICATIONS

This is a Non-Provisional Application of U.S. Provisional Application No. 62/502,441, filed in the United States on May 5, 2017, entitled, "Prediction of Multi-Agent Adversarial Movements through Signature-Formations Using Radon-Cumulative Distribution Transform and Canonical Correlation Analysis," the entirety of which is incorporated herein by reference.

BACKGROUND OF INVENTION

(1) Field of Invention

The present invention relates to a system for prediction of multi-agent adversarial movements and, more particularly, to a system for prediction of multi-agent adversarial movements through signature-formations.

(2) Description of Related Art

At the early stage of "machine-based" tactic analytics the main focus was to improve agent re-identification (as described in Literature Reference No. 4 in the List of Incorporated Literature References), tracking (as described in Literature Reference No. 2), and action and activity recognition (as described in Literature Reference Nos. 4 and 5). The progress in these applications combined with the recent advances in perception has paved the way for a more complex analysis of multi-agent tactics and strategies in adversarial domains. However, the intricacy of such highly dynamic systems has led the research toward simplifying assumptions, such as the independence between agents (see Literature Reference Nos. 2, 3, and 6).

In one application of tactic analytics, a new challenge in professional team sports is to automatically provide tactical feedback to coaches in real-time. Work to better understand team behavior by Lucey et al. (see Literature Reference No. 1) proposed a role-based representation, which significantly reduced the problem of high permutation in player movements. Additionally, Intille et al. (see Literature Reference No. 7) modeled the interactions between player trajectories using Bayesian network.

Furthermore, Li et al. (see Literature Reference No. 8) used a multi-modal density function to classify different offensive plays. Literature Reference No. 9 disclosed segmenting group motion and using a spatio-temporal driving force model to identify offensive plays in American football. In soccer, Kim et al. (see Literature Reference No. 12) estimated the global movement of the players using a dense motion field. The authors then looked for convergence of theses motion fields to indicate the key events.

Moreover, in Literature Reference No. 10, Wang et al. formulated a network-flow to track all players simultaneously by considering interactions between players, and Bialkowski et al. (see Literature Reference No. 13) used formation analysis to compare the performance of the team when the game is played at home compared to when it is played away.

In each of the approaches described above, the simplifying assumptions eliminate an important part of tactical behavior mainly due to the limitations in computational power. Thus, a continuing need exists for a comprehensive representation of team players and ball trajectory prior to application of pattern recognition.

SUMMARY OF INVENTION

The present invention relates to system for prediction of multi-agent adversarial movements and, more particularly, to a system for prediction of multi-agent adversarial movements through signature-formations. The system comprises one or more processors and a non-transitory computer-readable medium having executable instructions encoded thereon such that when executed, the one or more processors perform multiple operations. The system applies a Radon Cumulative Distribution Transform (Radon-CDT) to pairs of signature-formations obtained from a dataset, wherein signature-formations represent agent movements. Canonical correlation analysis (CCA) components are identified for the pairs of signature-formations.

The present invention also comprises a system for prediction of multi-agent adversarial movements in which the system learns a relationship between pairs of signature formations using canonical correlation analysis (CCA) components, wherein signature-formations represent agent movements. The system predicts a counter signature-formation for a new dataset using the learned relationship and a new signature-formation. The system then adjusts control parameters of a device based on the predicted counter signature-formation.

In another aspect, a Radon-CDT is applied to pairs of signature-formations obtained from the new dataset, wherein the pairs of signature-formation represent a first set of agents' movements. The system predicts a corresponding counter signature-formation for the pairs of signature-formations obtained from the new dataset in a Radon-CDT space using CCA, resulting in the predicted counter signature-formation. The predicted counter signature-formation represents a second set of agents' movements. The predicted signature-formation is inverted from the Radon-CDT space to an image space.

In another aspect, the predicted counter signature-formation is used to predict how to counter at least one adversary's spatial formation.

In another aspect, the system applies an inverse Radon Cumulative Distribution Transform (iRadon-CDT) to visualize counter signature-formations in the image space.

In another aspect, the displayed counter signature-formation provides real-time tactical feedback to a user.

In another aspect, the device is an unmanned aerial vehicle (UAV).

In another aspect, the device is an autonomous vehicle.

In another aspect, the device is a camera.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The file of this patent or patent application publication contains at least one drawing executed in color. Copies of this patent or patent application publication with color drawing(s) will be provided by the Office upon request and payment of the necessary fee.

The objects, features and advantages of the present invention will be apparent from the following detailed descriptions of the various aspects of the invention in conjunction with reference to the following drawings, where.

DETAILED DESCRIPTION

Figure 1:
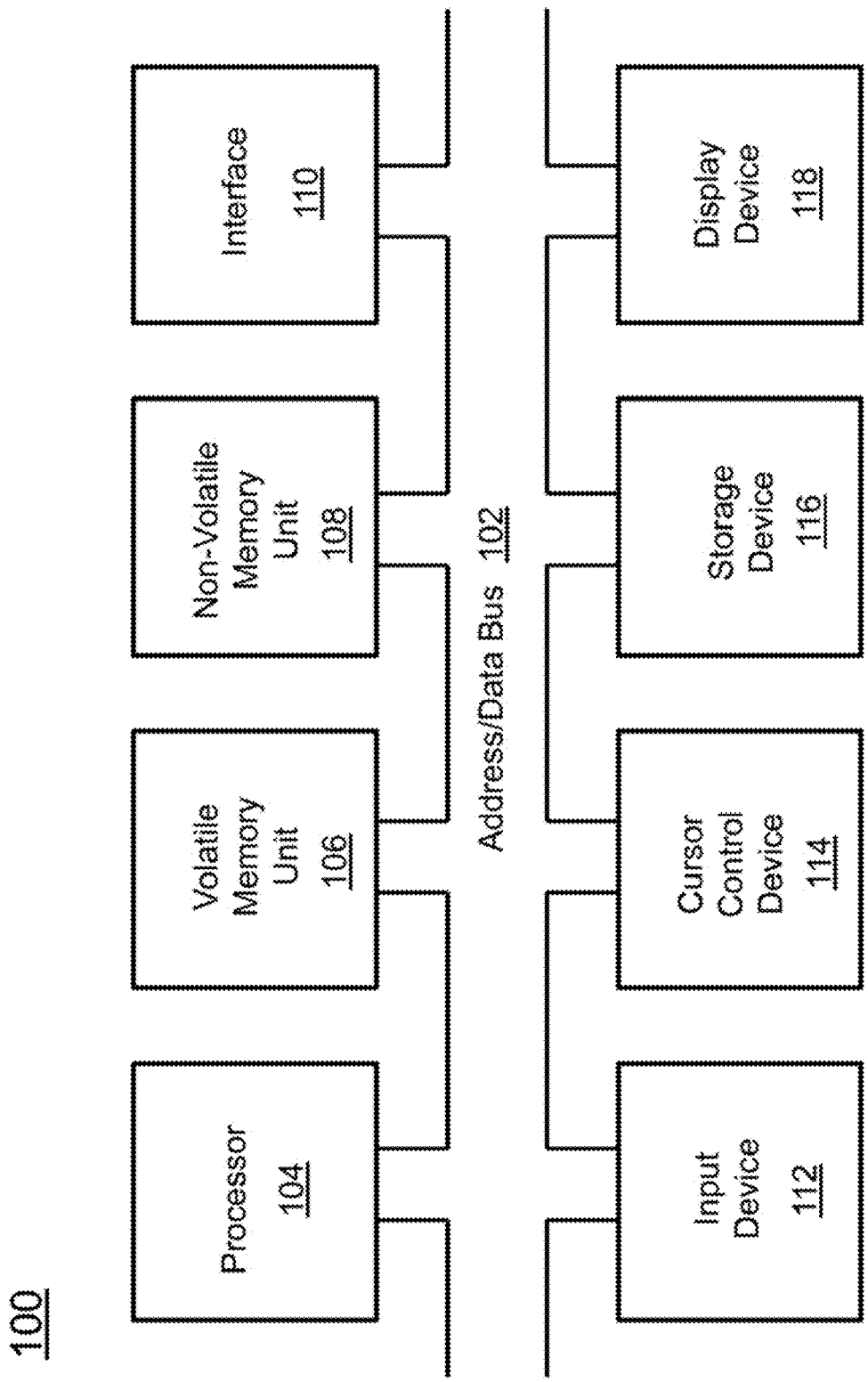
FIG. 1 is a block diagram depicting the components of a system for prediction of multi-agent adversarial movements according to some embodiments of the present disclosure.

The present invention relates to a system for prediction of multi-agent adversarial movements and, more particularly, to a system for multi-agent adversarial movements through signature-formations. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) LIST OF INCORPORATED LITERATURE REFERENCES

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number.

1. Lucey, Patrick, et al. "Representing and discovering adversarial team behaviors using player roles." Proceedings of the IEEE Conference on Computer Vision and Pattern Recognition, 2013.
2. Ali, Saad, and Mubarak Shah. "Floor fields for tracking in high density crowd scenes." European conference on computer vision. Springer Berlin Heidelberg, 2008.
3. Pellegrini, Stefano, et al. "You'll never walk alone: Modeling social behavior for multi-target tracking." 2009 IEEE 12th International Conference on Computer Vision. IEEE, 2009.
4. Bialkowski, Alina, et al. "Recognising team activities from noisy data." Proceedings of the IEEE Conference on Computer Vision and Pattern Recognition Workshops, 2013.
5. Wang, Heng, et al. "Action recognition by dense trajectories." Computer Vision and Pattern Recognition (CVPR), 2011 IEEE Conference on. IEEE, 2011.
6. Tran, Du, and Junsong Yuan. "Optimal spatio-temporal path discovery for video event detection." Computer Vision and Pattern Recognition (CVPR), 2011 IEEE Conference on. IEEE, 2011.
7. Intille, Stephen S., and Aaron F. Bobick. "A framework for recognizing multi-agent action from visual evidence." AAAI/IAAI 99, 518-525, 1999.
8. Li, Ruonan, Rama Chellappa, and Shaohua Kevin Zhou. "Learning multi-modal densities on discriminative temporal interaction manifold for group activity recognition." Computer Vision and Pattern Recognition, 2009. CVPR 2009. IEEE Conference on. IEEE, 2009.
9. Li, Ruonan, and Rama Chellappa. "Group motion segmentation using a spatio-temporal driving force model." Computer Vision and Pattern Recognition (CVPR), 2010 IEEE Conference on. IEEE, 2010.

10. Wang, Xinchao, et al. "Tracking interacting objects optimally using integer programming." European Conference on Computer Vision. Springer International Publishing, 2014.
11. Bialkowski, Alina, et al. "Win at home and draw away": automatic formation analysis highlighting the differences in home and away team behaviors." Proceedings of 8th Annual MIT Sloan Sports Analytics Conference, 2014.
12. Kim, Kihwan, et al. "Motion fields to predict play evolution in dynamic sport scenes." Computer Vision and Pattern Recognition (CVPR), 2010 IEEE Conference on. IEEE, 2010.
13. Kolouri, Soheil, Saurav Basu, and Gustavo K. Rohde. "Learning and visualizing statistical relationships between protein distributions from microscopy images." In 2014 IEEE 11th International Symposium on Biomedical Imaging (ISBI), pp. 381-384 IEEE, 2014.
14. Kolouri, Soheil, Se Rim Park, and Gustavo K. Rohde, "The Radon cumulative distribution transform and its application to image classification." IEEE Transactions on image Processing 25, no. 2, 920-934, 2016.

(2) PRINCIPAL ASPECTS

Various embodiments of the invention include three "principal" aspects. The first is a system for prediction of multi-agent adversarial movements. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
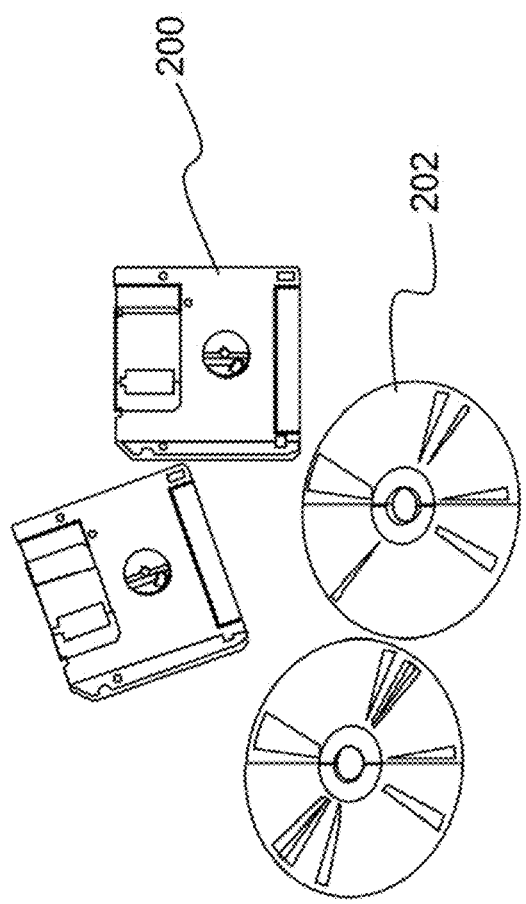
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) SPECIFIC DETAILS OF VARIOUS EMBODIMENTS

Described is a method to predict multi-agent adversary movements in scenarios for which a perfect tracking of each agent at each time step is not known, but the overall formation of the adversary is known. The overall spatial formation, or signature-formation, of the adversary is presented through a two-dimensional (2D) heat map (time-lapse images), and the task is to predict a suitable counter formation. Signature formations for any teams of agents (e.g., basketball players, drone agents) are the time-lapse images of the team performing a certain task (e.g., basketball players during a shot clock). Therefore, the temporal information of players/agents is implicitly expressed in these time-lapse images; however, the signature formations do not contain the explicit position and velocity information of the players. Cameras or LIDARS (light surveying radars) can be used to obtain time-lapse images. The time-lapse images are a summation of all obtained images over time. There are many existing techniques to obtain such images (e.g., slow shutter speed, open shutter imaging).

A counter-formation is generated from the spatial position of each agent during an arbitrary time window that aims to provide a formation to effectively counter or oppose the signature-formation of the adversary. Such tasks are commonly required in real-world applications, such as sports. For instance, a new challenge in professional team sports is to automatically provide tactical feedback to coaches in real-time. The technique according to embodiments of this disclosure facilitates this challenge by automating the prediction of the adversary signature-formations. The predicted signature-formations highly correlate with the actual (ground truth) signature counter-formations. Therefore, the predicted signature-formations are counter-formations.

In one embodiment, the system consists of a three-phase operational process. In the first phase, the system receives the adversary's signature formation in the form of a two-dimensional heat map and applies the Radon Cumulative Distribution Transform (Radon-CDT) (see Literature Reference No. 14 for a description of Radon-CDT) to the input. Radon-CDT is a nonlinear and invertible transformation that enables linear modeling of two-dimensional signature heat maps. In the second phase, canonical correlation analysis is used to predict the corresponding counter signature-formation in the Radon-CDT space. In the third phase, inverse Radon-CDT (iRadon-CDT) is used to invert the predicted signature-formation from the Radon-CDT space to the image space and generate a visual result for display. With the capability of making a prediction of adversary movements (e.g., swarm of drones, team of basketball), the system can be used to lure an adversary to a 'trap'. To this note, if the 'trap' signature formation is known, then the home swarm can be guided via specific movement commands (e.g., controls such as acceleration, deceleration, turns) such that it drives the adversary swarm into the trap signature formation. In the example of basketball, by providing the relationship between defensive formation and offensive formation, coaches can lead their team such that the visiting team gets lured into a trap.

The system described herein exploits the high level semantics in adversary team behavior and uses this information to make a prediction on how to counter the adversary's formation. The term "high level semantics" refers to the fact that high level information, such as tactical movements, rather than low level information, such as speed or heading of each agent, is used. The embodiment described in this disclosure utilizes a higher level prediction of adversarial agents' movements in the form of signature-formations, which is an improvement over existing technologies.

In one embodiment, the system predicts a counter formation to that of an adversarial multi-agent system. As a real-world application of such a system, the problem of tactical analysis for the duration of each shot clock in the game of basketball is described. The system according to embodiments of the present disclosure utilizes a unique representation for the multi-agent movements over time, denoted as the signature-formation that captures the essence of the agent movements through time. Described below is an algorithm which takes an image based trajectory of the adversary team as input and predicts the best response in the form of a signature-formation.

Figure 3:
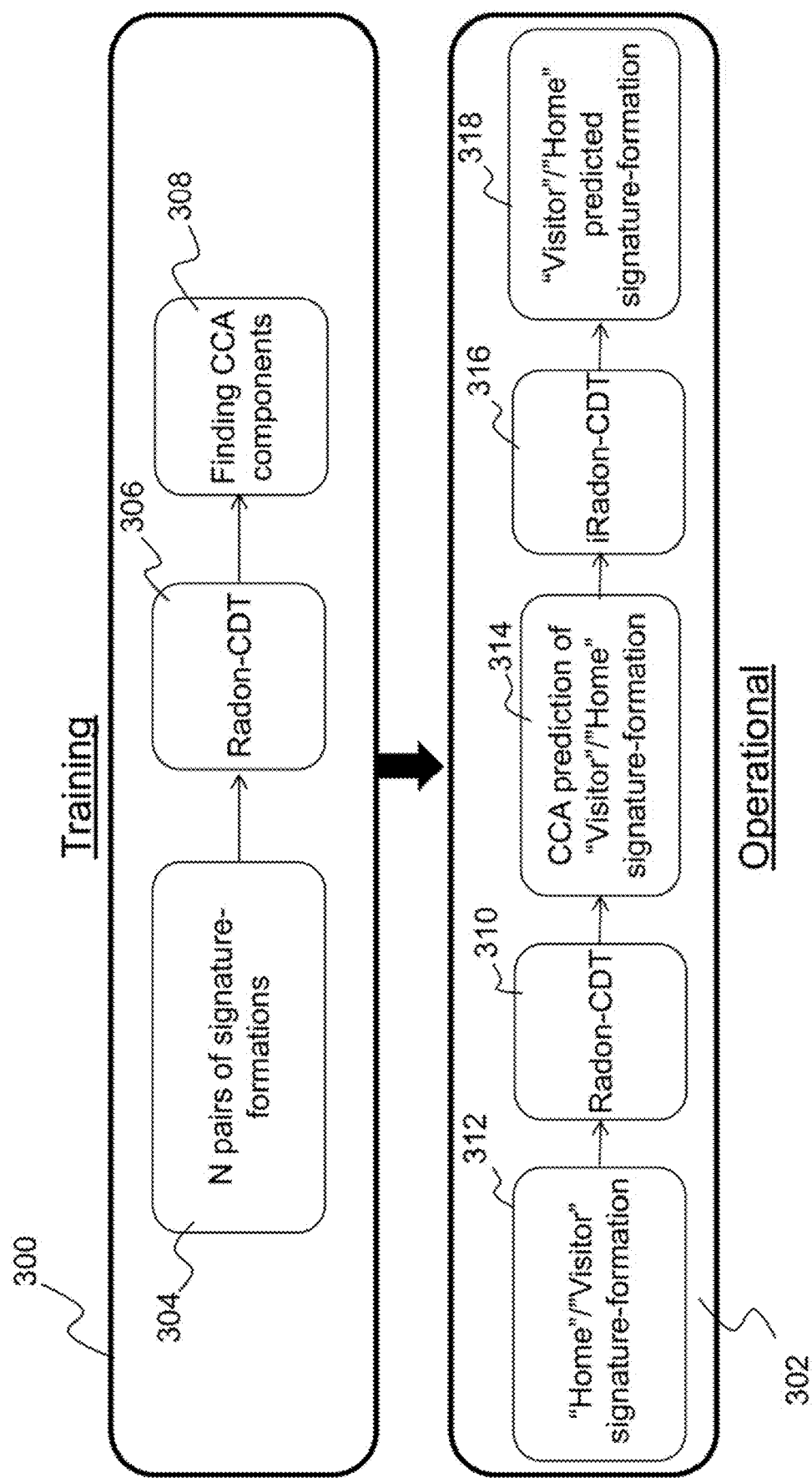
FIG. 3 is an illustration of training and operation of the system for prediction of multi-agent adversarial movements according to some embodiments of the present disclosure.

FIG. 3 shows the information-flow diagram of the system described herein. The system contains a training phase 300 and an operational phase 302. In the training phase 300, the relationship between available signature-formation pairs is learned. The learned information is then used to predict the most probable counter signature-formation in the opeerational phase. In the training phase 300, pairs of signature-formations are extracted from a dataset (i.e., N pairs of signature-formations 304). The template signature-formation for the Radon-CDT 306 was chosen to be the average of the N pairs of signature-formations 304 over the training set.

After applying the Radon-CDT 306 canonical correlation analysis (CCA), components were found from the training dataset (i.e., finding CCA components 308). In the operational phase 302, a radon cumulative distribution transform (Radon-CDT) 310 was applied to signature-formations of the "home" and "visitor" teams (element 312). Canonical correlation analysis (CCA) is used to predict the corresponding counter signature-formation in the Radon-CDT space (i.e., CCA prediction of "visitor"/"home" signature-formation 314). Inverse Radon-CDT (iRadon-CDT 316) is used to invert the predicted signature-formation from the Radon-CDT space to the image space, resulting in a "visitor"/"home" predicted signature-formation 318. Each of these aspects will be described in further detail below.

Before describing the technique for making predictions in detail, a review of the constraints in the example scenario, a basketball game, is provided. The game of basketball consists of four quarters, the duration of each quarter is 720 seconds (12 minutes (min)) leading to 2,880 seconds total in each National Basketball Association (NBA) match. The clock countdown starts once the player's hand (from the team who has the possession) touches the ball. There are two timekeeping processes in the game; first, the game clock and second, the shot clock. Once a team has a possession they have up to 24 seconds to make a shot. The shot clock duration varies due to various reasons including rebound, crossing over the court boundaries, or simply due to making the shot at any instance. The shot clock resets either when a shot is taken (and the shot hits the rim) and the team that took the shot gets the rebound, or when the possession of the ball changes, giving the team that has possession of the ball a time window of 24 seconds to make their shot. Note that given the total duration of 2,880 seconds in each match and the 24 second shot clock, the minimum number of shot opportunities is 30, but this number is much larger in practice.

In experimental studies, tactical analysis was investigated during each complete duration between the two consecutive shot clock resets. Each duration between shot clock resets is referred to as an "event". In the following subsections, first the tactical representation for each event duration according to embodiments of the present disclosure is described followed by a description of an appropriate algorithm in order to exploit the tactical information.

(3.1) Signature Formations (Element 312)

Figure 4:
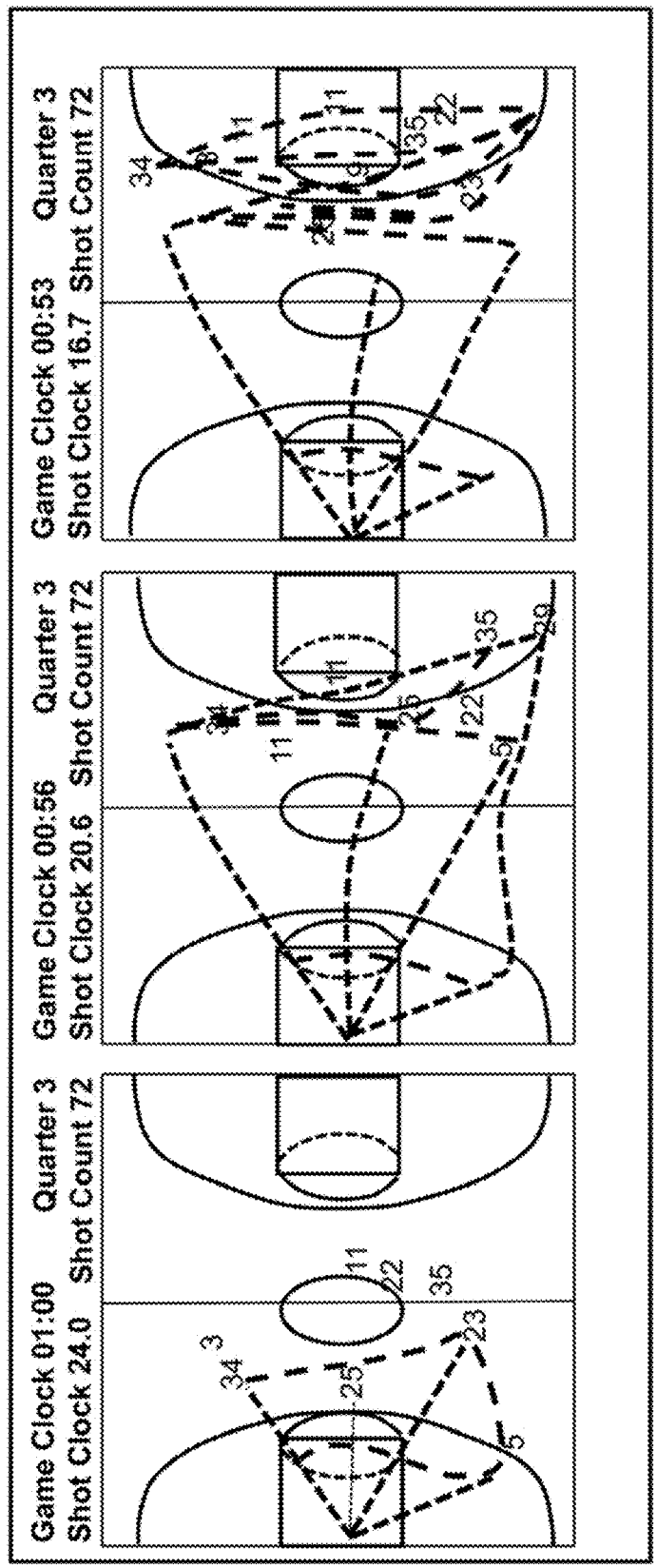
FIG. 4 is an illustration of the progression of players during a shot clock and the creation of their pheromone-like signature-formation according to some embodiments of the present disclosure.

In the method described herein, the tactical patterns in an image domain are exploited via signature-formations. The signature-formation is essentially the temporal integration of the agents' movement (without tracking agents) in each event. In other words, the signature-formation captures a pheromone-like effect of the agents' movements. FIG. 4 depicts several snapshots during a shot clock and the development of a signature-formation (represented by dashed lines).

In the dataset used for experimental studies, there are signature-formations of the home and visitor teams for nearly 10,000 shot clocks from NBA games. Below is a description of prediction of the counter signature-formation for a given formation.

(3.1.1) Radon-CDT (Element 310)

Radon-CDT is a nonlinear and invertible image transformation. In order to be able to define Radon-CDT, a review of the Radon transform (see Literature Reference No. 14) is provided. For a two-dimensional image, I: $R^2 \to (0,1]$, its Radon transform can be written as:

$$\hat{I}(t, \theta) = \int_{-\infty}^{\infty}\int_{-\infty}^{\infty} I(x, y)\delta(t - x\cos(\theta) - y\sin(\theta))dxdy,$$

where $\delta(.)$ is the Dirac function, and $\theta$ is the projection angle. Let a given signature-formation, I: $R^2 \to (0,1]$, be normalized, such that $$\int_{-\infty}^{\infty}\int_{-\infty}^{\infty} I(x, y)dxdy = 1,$$

then the Radon-CDT with respect to a normalized template signature-formation, $I_0$, is defined as:

$$\tilde{I}(.,\theta) = (f(.,\theta) - id(.))\sqrt{\hat{I}_0(.,\theta)},$$

where id is the identity function, $\theta$ is the projection angle, $\hat{I}_0$ is the Radon transform of the template, and $f(., \theta)$ is a transport map that satisfies the following equation:

$$\int_{-\infty}^{f(t,\theta)} \hat{I}(\tau, \theta)d\tau = \int_{-\infty}^{t} \hat{I}_0(\tau, \theta)d\tau.$$

Note that, since the right-hand side of the above equation is a monotonically increasing function in t, and the left-hand side is a monotonically increasing function in $f(t, \theta)$, there is a unique solution to the above equation and $f(t, \theta)$ has a closed form solution for a fixed projection angle (see Literature Reference No. 14). More importantly, Radon-CDT is invertible and the inverse Radon-CDT (iRadon-CDT) is defined through:

$$I = \mathcal{R}^{-1}(det(Dg)\hat{I}_0(g)),$$

where $\mathcal{R}^{-1}(.)$ is the inverse Radon transform, and $g(t, \theta) = [f^{-1}(t, \theta), \theta]^T$. For a more detailed explanation of the transform, refer to Kolouri et al. (see Literature Reference No. 14).

Figure 5A:
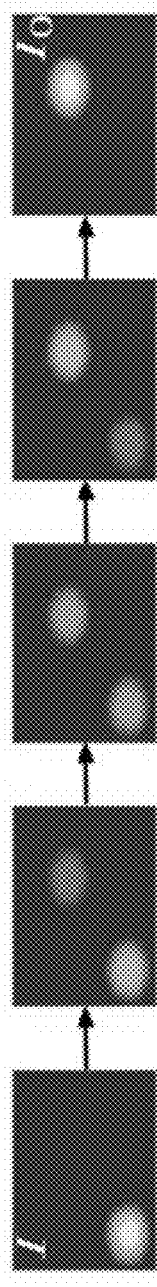
FIG. 5A is an illustration of a linear combination of two sample images in the image space according to some embodiments of the present disclosure.
Figure 5B:
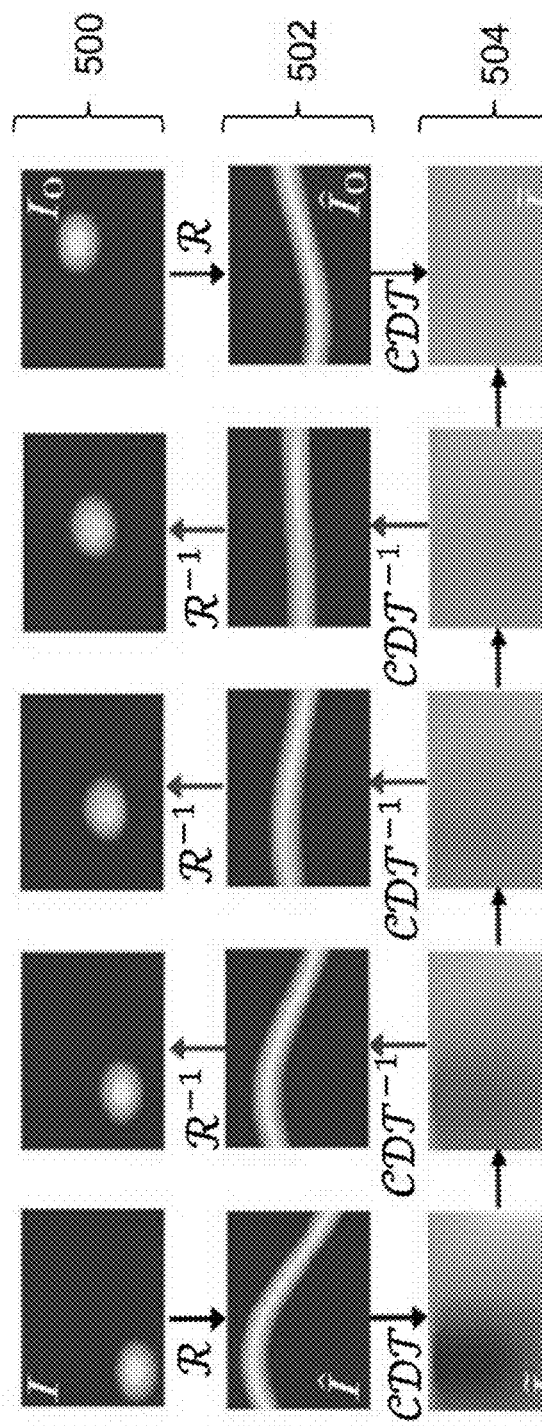
FIG. 5B is an illustration of a linear combination of two sample images in the Radon-Cumulative Distribution Transform (CDT) space according to some embodiments of the present disclosure.

The nonlinearity and invertibility of the Radon-CDT enables one to apply the well-established linear modeling techniques in the transform space, and then invert the results back to the image space. To demonstrate nonlinearity and invertibility of the Radon-CDT, simply take the linear combination of two images in the image space and in the Radon-CDT transform space. Then, invert the linear combination of transformed images back to the image space. FIG. 5A depicts the linear combination of images, and 5B illustrates the linear combination of the radon-CDT of the images. The first row 500 of FIG. 5B represents the image space, the second row 502 of FIG. 5B represents the Radon transform space, and the third row 504 represents the Radon-CDT space.

Figure 6:
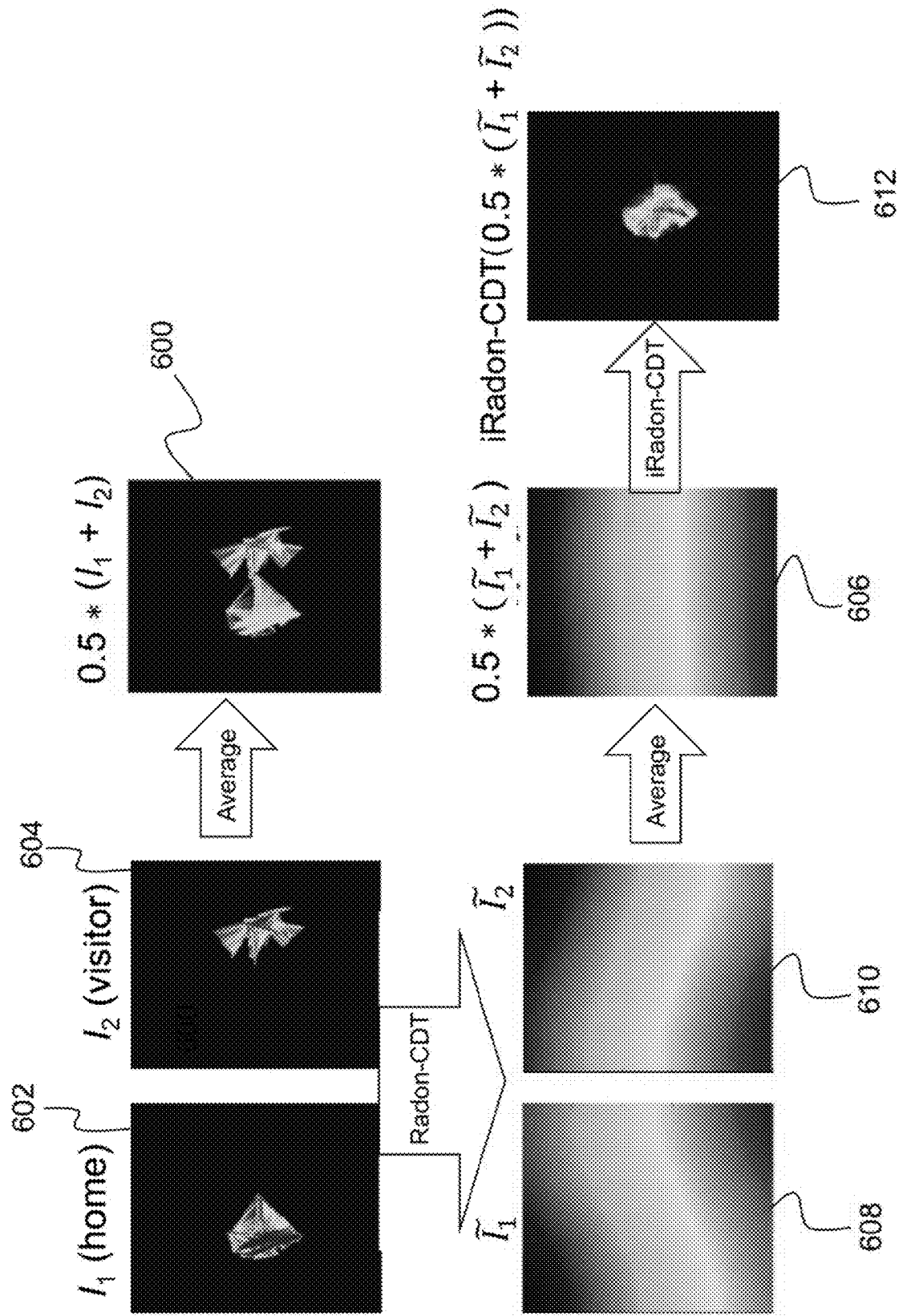
FIG. 6 is an illustration of averaging two signature-formations in the image space and in the Radon CDT space according to some embodiments of the present disclosure.

Furthermore, the Radon-CDT was applied to two sample signature-formations to demonstrate its applicability to more complex images. FIG. 6 shows the resulting average image 600 of two signature-formations in the image space 602 and 604 as well as the resulting average image 606 of two signature-formations in the Radon-CDT space 608 and 610. Image 612 is the result of application of inverse Radon Cumulative Distribution Transform (iRadon-CDT) to visualize counter signature-formations in the image space. It can be seen that the average image 606 obtained from the Radon-CDT presents a meaningful average signature-formation. Note that the process of averaging is only used to demonstrate a linear operator (i.e., linear combination of images). All signature-formations for home and visitor teams are first transformed to the Radon-CDT space. Then, the representations are vectorized and processed via canonical correlation analysis as described below.

(3.1.2) Canonical Correlation Analysis (CCA) (Element 314)

In the approach according to embodiments of this disclosure, the signature-formations of the "home" and "visitor" teams during a shot clock are first normalized (to sum to one) and processed through the Radon-CDT and then embedded into two vectors, namely h and v. Let N be the total number of tactical formations during the shot clocks in various games such that $h_n \in R^M$ and $v_n \in R^M$, where M is the length of the vectorized Radon-CDT presentation of signature-formations. The goal here is to find the relationship between the 'home' and 'visitor' signature-formations. Formally, for a given formation of the home team, h, find the most probable formation of the adversary, v. This can be achieved via CCA that seeks a shared embedding for h and v such that the embedded representations for the same shot clock lay close to each other. In the training phase, CCA maximizes the following objective function:

$$CCA_{comp} = \operatorname*{argmax}_{u,w} \frac{\sum_{n=1}^{N}(u^T h_n)(v_n^T w)}{\sqrt{\sum_{n=1}^{N} u^T h_n h_n^T u} \sqrt{\sum_{n=1}^{N} w^T v_n v_n^T w}} = \operatorname*{argmax}_{u,w} \frac{u^T C_{hv} w}{\sqrt{u^T C_{hh} u} \sqrt{w^T C_{vv} w}},$$

where u and w are the CCA components that project the data onto the shared embedding, and $C_{hh}$, $C_{vv}$, and $C_{hv}$ are the covariance matrices. Let $U=[u_1, \ldots, u_K] \in R^{M \times K}$ and $W=[w_1, \ldots, w_K] \in R^{M \times K}$ be the canonical component matrices, containing the top K canonical correlation components learned based on the training data (i.e., the covariance matrices where calculated based on the training data).

(3.2) Predicting the Signature-Formations (Elements 316 and 318)

In the operational phase, for an input signature-formation of the "visitor" team (i.e., adversary), J: $R^2 \rightarrow (0,1)$, first calculate its Radon-CDT, $\tilde{J}$. Then, the Radon-CDT representation is vectorized, $v=vec(\tilde{J})$. Next, CCA is used to predict the corresponding transformed and vectorized signature-formation, h, as follows:

$$\hat{h} = UW^T v.$$

The predicted transformed and vectorized signature-formation is reshaped and then the iRadon-CDT is applied to obtain the predicted signature-formation for the home team, I=iRadon-CDT(reshape($\hat{h}$)). This process can also be done in the other direction to predict the adversary's signature-formation for a given home signature-formation. As is described in detail below, through CCA, experimental studies showed that there are significant correlations between the offensive and the corresponding defensive formations within each shot clock period. In the example of basketball, by providing the relationship between defensive formation and offensive formation, coaches can lead their team such that the visiting team gets lured into a trap.

(3.3) Experimental Studies

The dataset used in experimental studies was obtained from STATS SportsVU tracking data for the 2012-2013 NBA season. The SportVU dataset is obtained from visual data collected from six cameras installed on top of the basketball arenas. The available information contains player's position, ball position, team identifications (IDs) and player IDs, game clock, shot clock, quarter indication, and more for 663 games across 13 NBA teams with the frequency of 25 frames per second. In experimental studies, player and ball position, shot clocks, and the score were used. The signature-formations were extracted from the dataset, leading to nearly 10,000 pairs of signature-formations (i.e., 'home' and 'visitor').

Figure 7:
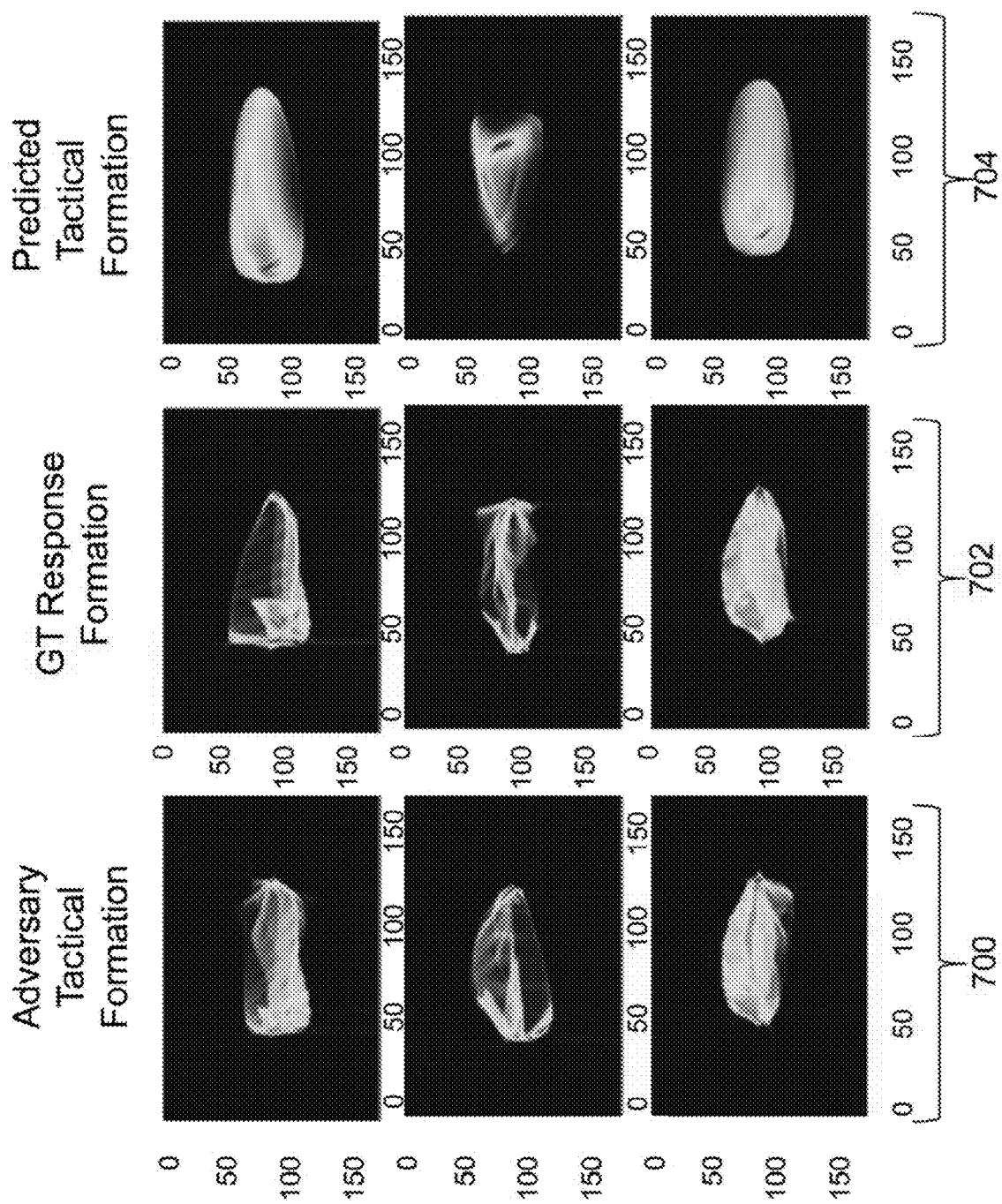
FIG. 7 is an illustration of prediction of signature-formations according to some embodiments of the present disclosure.

In the training phase, 20% of the dataset was held out for testing (nearly 2,000 pairs). The template signature-formation for the Radon-CDT was chosen to be the average of the signature-formations over the training set. The number of projections in the Radon-CDT was chosen to be 90. A higher number of projections leads to a more accurate reconstruction; however, it could be computationally expensive. After applying the Radon-CDT, K=15 canonical correlation components were found from the training dataset. The number 15 was calculated by thresholding the amount of correlation captured by the canonical components. Finally, for a given 'adversary' signature formations, the counter signature-formations for the operational dataset was predicted. FIG. 7 shows sample results obtained by applying the method described herein to predict the signature-formations in the game of basketball. Note that these graphs are in the spatial domain, and the x and y coordinates of the graph represent the x and y coordinates of the basketball court. The left column 700 represents adversary tactical formation, the middle column 702 represents ground-truth (GT) response formation, and the right column 704 represents predicted tactical formation.

In summary, the method according to embodiments of the present disclosure models team or adversary behavior. In the example of a sports team, it creates a comprehensive representation (i.e. the signature formation) with the team players and ball trajectory before a pattern recognition algorithm is applied. Given the signature-formation of both teams, Radon-CDT and CCA is used to learn an implicit relationship between offensive and defensive signature-formations.

Figure 8:
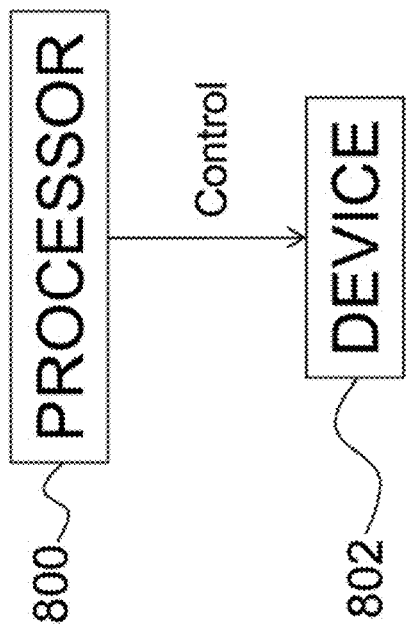
FIG. 8 is a flow diagram illustrating control of devices using the prediction of signature-formations according to some embodiments of the present disclosure.

This disclosure focused on sport analytics due to the real-world nature of the datasets in addition to the fact that the sport analytics industry is rapidly growing in professional sports. However, as can be appreciated by one skilled in the art, the method has various applications in intelligence, surveillance, and reconnaissance (ISR) and controlling devices used in ISR. FIG. 8 is a flow diagram illustrating using a processor 800 to control a device 802 using the predicted counter signature-formation. Non-limiting examples of devices 802 that can be controlled via the processor 800 and the prediction include a vehicle or a vehicle component, such as a brake, a steering mechanism, suspension, or safety device (e.g., airbags, seatbelt tensioners, etc.). Further, the vehicle could be an unmanned aerial vehicle (UAV), an autonomous ground vehicle (e.g., car, motorcycle, robot), or a human operated vehicle (e.g., car) controlled either by a driver or by a remote operator. Additionally, the device can be a camera.

For instance, UAV swarms can be utilized in various research and development projects. In ISR applications, the movement of adversarial agents as a response to friendly tactical moves can be predicted. The prediction can then be used to make a decision regarding an action to be taken in response to the movement. In an UAV, the action may be causing the UAV to move in a different direction or otherwise away from adversarial agents to avoid detection by adjusting control parameters related to speed and direction. The system may implement the action by operating a vehicle component of the UAV, such as rotors or steering components, etc.

Alternatively, the action may be movement of the UAV to a position that provides an ideal location for surveillance and imaging of the adversarial agents. For example, if the device being controlled is a camera in an UAV, the prediction generated by the system described herein can be used to adjust zoom (e.g., wide angle view, close-up view), change camera angle (e.g., up, down, right, left), and other camera parameters based on the prediction. In other words, the predicted counter-signature formation can be used to direct the focus, direction, angle, or any other useful control parameter of a camera (or any other sensor) in order to collect additional data from the adversarial agents. By being able to predict a spatial arrangement, or counter signature-formation, of the adversarial agents, a host of actions can be taken that take advantage of this knowledge. As can be appreciated by one skilled in the art, control of other device types is also possible.

Figure 9:
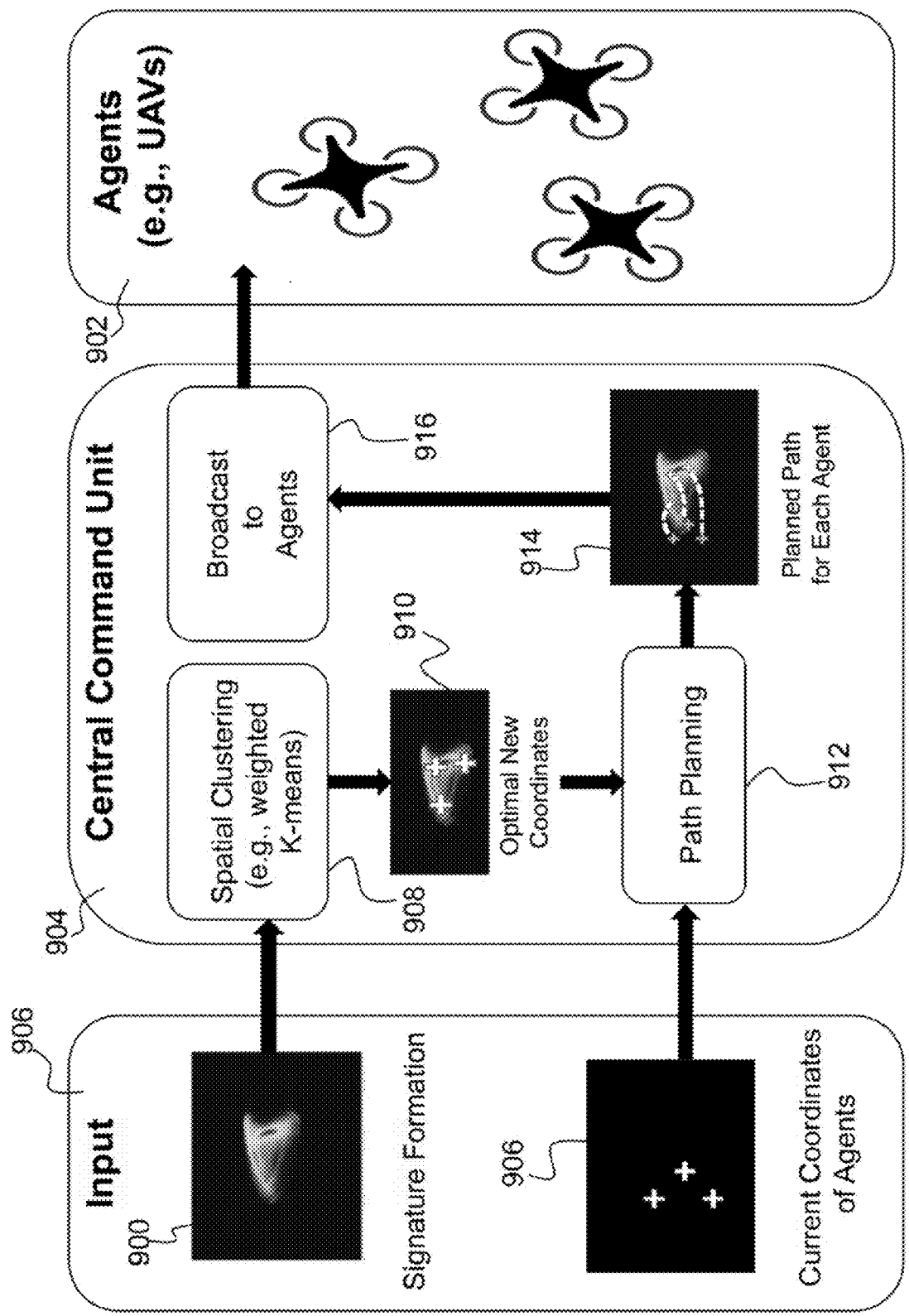
FIG. 9 is an illustration of a central command unit according to some embodiments of the present disclosure.

The signature formations provide a measure of strategic importance over the space of interest in a short period of time (e.g., tens of seconds). For instance, in the signature formation 900 shown in FIG. 9, the heatmap of the signature formation 900 indicates the strategic importance of the underlying spatial coordinates. The signature formation 900 can be translated into commands for the team of agents 902 (e.g. swarm of UAVs). This is done via a central command unit 904 that receives the signature formations 900 at each temporal window (e.g., tens of seconds), extracts the best formation of agents and reroutes the agents to provide the best coverage of strategic areas. The signature formation 900 and the current coordinates of the agents 906 are fed to the central command unit 904 as inputs 906. The central command unit 904 first processes the signature formation 900 with an efficient spatial clustering algorithm (e.g. weighted K-means) 908 to obtain the centroids of strategic importance (i.e., the optimal new coordinates 910) for the agents. The optimal coordinates 910 and the current coordinates of the agents 906 are fed to an off-the-shelf path planning algorithm 912 to find the optimal paths for each agent (i.e., planned path for each agent 914). Finally, the commands are broadcasted to the agents 916.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while method steps have been recited in an order, the method steps may occur in any desired order and fall within the scope of the present invention.

What is claimed is:

1. A system for predicting multi-agent movements, the system comprising:
   one or more processor and a non-transitory computer-readable medium having executable instructions encoded thereon such that when executed, the one or more processors perform operations of:
   learning a relationship between pairs of signature-formations obtained from a dataset by applying a Radon Cumulative Distribution Transform (Radon-CDT) to the pairs of signature-formations and identifying canonical correlation analysis (CCA) components for the pairs of signature-formations, wherein signature-formations represent agent movements;
   predicting a counter signature-formation for a new dataset using the learned relationship and a new signature-formation; and
   adjusting control parameters of a device based on the predicted counter signature-formation.

2. The system as set forth in claim 1, wherein the one or more processors further perform operations of:
   applying the Radon-CDT to pairs of signature-formations obtained from the new dataset, wherein the pairs of signature-formations obtained from the new dataset represent a first set of agents' movements;
   predicting a corresponding counter signature-formation for the pairs of signature-formations obtained from the new dataset in a Radon-CDT space using CCA, resulting in the predicted counter signature-formation, wherein the predicted counter signature-formation represents a second set of agents' movements; and
   inverting the predicted counter signature-formation from the Radon-CDT space to an image space.

3. The system as set forth in claim 2, wherein the one or more processors further perform an operation of applying an inverse Radon Cumulative Distribution Transform (iRadon-CDT) to visualize counter signature-formations in the image space.

4. The system as set forth in claim 1, wherein the predicted counter signature-formation is used to predict how to counter at least one adversary's spatial formation.

5. The system as set forth in claim 1, wherein a displayed counter signature-formation provides real-time tactical feedback to a user.

6. The system as set forth in claim 1, wherein the device is an unmanned aerial vehicle (UAV).

7. The system as set forth in claim 1, wherein the device is an autonomous vehicle.

8. The system as set forth in claim 1, wherein the device is a camera.

9. A computer implemented method for predicting multi-agent movements, the method comprising an act of:
   causing one or more processors to execute instructions encoded on a non-transitory computer-readable medium, such that upon execution, the one or more processors perform operations of:
   learning a relationship between pairs of signature-formations obtained from a dataset by applying a Radon Cumulative Distribution Transform (Radon-CDT) to the pairs of signature-formations and identifying canonical correlation analysis (CCA) components for the pairs of signature-formations, wherein signature-formations represent agent movements;
   predicting a counter signature-formation for a new dataset using the learned relationship and a new signature-formation; and adjusting control parameters of a device based on the predicted counter signature-formation.

10. The method as set forth in claim 9, wherein the one or more processors further perform operations of:
applying the Radon-CDT to pairs of signature-formations obtained from the new dataset, wherein the pairs of signature-formations obtained from the new dataset represent a first set of agents' movements;
predicting a corresponding counter signature-formation for the pairs of signature-formations obtained from the new dataset in a Radon-CDT space using CCA, resulting in the predicted counter signature-formation, wherein the predicted counter signature-formation represents a second set of agents' movements; and
inverting the predicted counter signature-formation from the Radon-CDT space to an image space.

11. The method as set forth in claim 10, wherein the one or more processors further perform an operation of applying an inverse Radon Cumulative Distribution Transform (iRadon-CDT) to visualize counter signature-formations in the image space.

12. The method as set forth in claim 9, wherein the predicted counter signature-formation is used to predict how to counter at least one adversary's spatial formation.

13. The method as set forth in claim 9, wherein a displayed counter signature-formation provides real-time tactical feedback to a user.

14. A computer program product for predicting multi-agent movements, the computer program product comprising:
computer-readable instructions stored on a non-transitory computer-readable medium that are executable by a computer having one or more processors for causing the one or more processors to perform operations of:
learning a relationship between pairs of signature-formations obtained from a dataset by applying a Radon Cumulative Distribution Transform (Radon-CDT) to the pairs of signature-formations and identifying canonical correlation analysis (CCA) components for the pairs of signature-formations, wherein signature-formations represent agent movements;
predicting a counter signature-formation for a new dataset using the learned relationship and a new signature-formation; and
adjusting control parameters of a device based on the predicted counter signature-formation.

15. The computer program product as set forth in claim 14, further comprising instructions for causing the one or more processors to further perform operations of:
applying the Radon-CDT to pairs of signature-formations obtained from the new dataset, wherein the pairs of signature-formations obtained from the new dataset represent a first set of agents' movements;
predicting a corresponding counter signature-formation for the pairs of signature-formations obtained from the new dataset in a Radon-CDT space using CCA, resulting in the predicted counter signature-formation, wherein the predicted counter signature-formation represents a second set of agents' movements; and
inverting the predicted counter signature-formation from the Radon-CDT space to an image space.

16. The computer program product as set forth in claim 15, further comprising instructions for causing the one or more processors to further perform an operation of applying an inverse Radon Cumulative Distribution Transform (iRadon-CDT) to visualize counter signature-formations in the image space.

17. The computer program product as set forth in claim 14, wherein the predicted counter signature-formation is used to predict how to counter at least one adversary's spatial formation.

18. The computer program product as set forth in claim 14, wherein a displayed counter signature-formation provides real-time tactical feedback to a user.

* * * * *